United States Patent Office 3,692,512
Patented Sept. 19, 1972

3,692,512
CONTROLLING AGRICULTURAL CHEMICAL SPRAY DRIFT WITH FOAM
Norman Henry Sachnik, P.O. Box 1484,
San Angelo, Tex. 76901
No Drawing. Continuation-in-part of applications Ser. No. 561,740, June 30, 1966, and Ser. No. 634,551, Apr. 28, 1967. This application June 3, 1969, Ser. No. 830,088
Int. Cl. A01n 5/00
U.S. Cl. 71—65
15 Claims

ABSTRACT OF THE DISCLOSURE

Chemicals, such as insecticides, herbicides, soil sterilants or other chemicals for agricultural purposes, are incorporated in a dense foam. The foam is made by mixing foaming materials and, generally, low surface tension surfactants with water. Then the liquid is expanded to about 8 times the liquid volume by mixing it with air. Said foam has a wide scope of applications and has proved particularly advantageous in large-scale operations.

RELATED APPLICATIONS

This is a continuation-in-part of my previously filed application Ser. No. 561,740, filed June 30, 1966, now abandoned. Also, it is related to my patent application Ser. No. 634,551, filed Apr. 28, 1967, now U.S. Pat. No. 3,618,856, and related to my patent application Ser. No. 824,868, now U.S. Pat. No. 3,604,509 filed on May 15, 1969.

BACKGROUND OF THE INVENTION

Field of the invention

This invention relates to agriculture and, more particularly, to applying chemicals to plants, to fungi or insects on plants or to soil in which plants are grown or are to be prevented from growing.

Description of the prior art

In agriculture today, many herbicides, insecticides, hormones, fertilizers, foliant nutrients and other chemical treatments are used upon plants. Applying these chemicals to the plants is a problem. In some applications, a finely ground chemical is dusted upon plants. In other situations chemicals are suspended or dissolved in a fluid and sprayed upon plants. Rice fields may be sprayed with Rogue [also called Propanil (3,4 - dichloropropion-anilide)], which kills much plant life other than rice, including any beneficial crops it comes in contact with. To alleviate such problems, considerable work has been done in developing selective herbicides, but this is costly and time-consuming.

Control of plant pests, such as insects, is commonly obtained by applying poisons to the pests, their environs or what they rely upon for sustenance. Scale on commercial orchards is controlled by spraying oil on affected trees while they are dormant in the winter. In other applications, e.g. around industrial plants or around airports, it is desired to kill all vegetation by sterilizing soil around fences or aircraft lights. In addition to herbicides, insecticides and soil sterilants referred to above, other agricultural treatments involve hormones, fertilizers and foliant nutrients. Modes of commercial application are virtually restricted to dusting with dry chemicals and spraying with liquids or dispersions. Most of these applications are made by dissolving the treatment chemical in a liquid and spraying the resulting solution in the form of a fine spray. Usually a very fine spray is desired to obtain increased coverage. Often the liquid will contain a surfactant to cause the chemical to dissolve therein and also to aid its adherence to plants to which it is applied. If the chemical is normally in a dry state, when the liquid, e.g. water, evaporates from the spray, a dry powder remains; such dry powder is often ineffective in the case of a herbicide or insecticide. On the other hand if the chemical is normally liquid, the evaporation of water therefrom is not ordinarily detrimental. Sometimes the chemical is a highly volatile substance which quickly vaporizes. Although a very fine spray is desirable to obtain good coverage, other factors may require the spray applicator to use large droplets to avoid adverse effects.

Drift of fine misty sprays is often a problem. It is most difficult to apply such sprays without having them drift downwind—often to an unwanted area. In some aerial applications, drift from a plane flying at less than 200 feet has been reported to reach an altitude of 5000 feet. Also, in certain cases, drift along the surface of the earth has been reported from as far as 30 miles.

Often the treatment chemical must be absorbed into the circulatory system of plants to which it is applied, particularly in the use of herbicides or in the use of a systemic insecticide, i.e. one which is absorbed into the circulatory system of a plant and kills insects which suck the juices of the plant. When a treatment chemical is dissolved or suspended in a liquid spray, the liquid may roll along the waxy surface of the leaves to the lower edge of said leaves and remain there (evenutally as a dry powder) rather than being evenly spread over the leaves.

Lowenstein, United Kingdom Pat. No. 486,113, is directed to a particular "method of producing a lasting foam" wherein specifically defined solid particles are combined with a mobile liquid from which the foam is prepared. In the case of foam for agricultural purposes, the solid particles may consist of substances which have a fertilizing, weed-killing or pest-combatting effect. Substances which are soluble with difficulty and which have hitherto been applied by scattering on the ground in the form of powder may conveniently be incorporated in the foam. The foam may be sprayed, poured or brushed on.

When solid particles are stirred in a liquid and air is led through the liquid to produce a foam, the resulting foam is not dense and does not consist of finely-divided bubbles.

Lowenstein fails t o indicate contemplated proportions of essential ingredients in foam designed for agricultural purposes. He excludes materials of a pasty or viscous consistency. He fails to consider any problems of large-scale operation, e.g. accuracy of application, drift, "wrap-around" (based on coherency), broadcasting to a site distant from the applicator, safety to the applicator and economics from the standpoint of less active ingredient per acre, less water per acre and less need to refill for any particular application.

Foam producing agents, according to the subject invention, are those materials which alter physical properties of a liquid so as to obtain maximum possible wetting of a plant surface and thus produce intimate contact between the plant and the foamed liquid. Lowenstein makes no reference to the wetting of the plant, only to the wetting of powdered solids. If the same wetting agents were optimum for both end results, it would be accidental; materials suitable for wetting a suspended solid do not necessarily possess the desired plant-wetting properties. Testing and development of plant wetting agents must by nature be directed toward substances which reduce the surface tension of water by 66% or to surface tensions of the order of 25 dynes per centimeter. This is a significant change of a very important physical property of water, whereas Lowenstein specifies materials which do not alter the physical properties of the liquid. The parameter for testing and evaluating of such wetting agents must be the relative ability to wet a limphodial or waxy surface, not as applied to elements, such as sulphur, mentioned by Lowenstein. Moreover, Lowenstein requires a mobile liquid whereas the subject invention is based primarily on foam prepared essentially from quiescent liquid.

SUMMARY OF THE INVENTION

Applying chemicals in an economical way to undesirable plant life, to fungi or insects on plants or to soil where desirable or undesirable plants grow can change a marginal or losing operation to a profitable one. The virtual elimination of drifting, per se, plays a material role in reducing the cost of applying agricultural chemicals when such application is effected in the form of foam. Foam makes it possible to obtain the same effect with a smaller amount of active ingredient. The accuracy which is possible in the placement of foam (reduced waste and keeping harmful chemicals from desirable plants) and the ability to see exactly where the foam has been applied lead to further economies.

Reduction in the use of fluid in the application of foam is significant. The advantage can be readily appreciated by considering broadcasting foam from an airplane. Twice the acreage (covered by a liquid spray producing comparable results with the same chemical) can be treated with the same load of water. Since more time is generally spent turning around at the end of a swath, returning to a temporary landing field, reloading with water and returning to the place of application than is actually spent in broadcasting the chemical, minimizing the amount of water employed is a prime consideration, particularly when results are not sacrificed. The same type of economies manifest themselves in applications from a tractor-mounted rig. Nearly as much time is required to fill the tank with water and move from a water trough to the field to be treated as that necessary for application.

The subject invention is directed primarily to a general method of agricultural chemical application rather than to any particular system of chemical agents. Agricultural chemicals include soil treatment chemicals, such as those which preclude vegetation as well as fertilizers and nutrients; they also include pesticides, e.g. herbicide, fungicide and insecticide. Within the ambit of said invention systemic pesticides provide peculiar advantages since the stable foam form places and maintains the active ingredient in a position and in a condition which keeps a greater amount thereof effective over a longer period of time. When an employed wetting agent wets a waxy surface or the smooth surface of a leaf, the foam containing same is further enhanced for the contemplated utility. Each such factor contributes materially to improved performance in pesticide application at less cost for the same or a better result.

The invention is particularly advantageous with respect to reduction in cost and in hazard when evaluated in comparison with conventional (liquid, mist or powder) spray applications.

The chemicals, per se, which are employed in the production of the foam and the active ingredients used for any specific problem are not, by themselves, the essence of the invention; they are basically known and available chemicals with which those competent in the art are familiar. Moreover, the art-skilled are well aware of application rates employed for particular agricultural chemicals in treating particular problems; the same application rates can be employed for treating the same problems with the subject foam form, but, ordinarily, it will be found that even a lower rate will accomplish comparable results.

For the type of application contemplated provision must be made for the continuous generation of foam, i.e. the foam must be capable of generation from air, foaming agent, active ingredients and water as it is being applied and at the location from which it is being applied. This capability is a major factor in multiplying the capacity of foam dispensing equipment. The foam must be dense (from 1 to 15 parts by volume of air per part by volume of water), consisting of finely-divided bubbles. Although solid active ingredients can be employed, when dissolved in a suitable solvent, in a manner similar to that for liquid agricultural chemicals, i.e. with the necessary surfactants, etc., solid agricultural chemicals are not otherwise practical unless the particle size thereof is fine enough, e.g. less than about 10 microns, to prevent their settling in quiescent liquid over a short period of time, e.g. less than ten minutes. Any suspension of solid agricultural chemical that may be employed is prepared in advance of the foam formation, thus necessitating at least that amount of stability. Although many commercial powders are suspendable, larger (heavier) particles would require fluid agitation of the spray suspension in the tank by paddles or fluid flow. An additional prerequisite for any practical use of larger particles is the avoidance of foaming in said tank. Such foaming is undesirable as it leads, inter alia, to loss of chemical and liquid because of overflow.

Chemicals incorporated in foam, e.g. aqueous foam generated with air, may be advantageously applied to plants or to ground in which plants grow. Said chemical(s) are suspended or dissolved in an appropriate amount of liquid vehicle, e.g. water, in a tank. The resulting solution or suspension is pumped with air into a continuous foam generator from which it can be withdrawn as required. The foam generator can be any well known foam producing device which employs air as the foam generating gas.

In ordinary water sprayings of one or more plants, some of the spray evaporates before it reaches the plant, much of the spray misses the plant and, furthermore, the spray often tends to form droplets upon the waxy surface or hairs of the leaves or bark of the plant and roll off. Even if the droplet does not roll off the bark or leaf, the water often evaporates from the spray upon the leaf or bark and leaves a dry chemical powder which is not readily absorbed into said leaf or bark. Furthermore, for insecticides designed to remain on the surface of the leaf to be consumed by an insect as it consumes the leaf, foam remains over the entire surface of the leaf and, when dry, leaves the chemical spread evenly over the leaf.

A product carried in foam remains in larger globs or droplets and does not drift as other applicable forms. This charatceristic makes it possible to apply a growth retardant to only one portion of a plant or to a specific area of plants. A growth retardant may be applied, e.g., to limbs of trees that are near electrical power lines, thus "chemically pruning" the trees. Also, it is possible to apply a growth retardant quite practically along highway rights of way so that the growth of grass in a selected band may be retarded.

The foam has a desirable enveloping characteristic. When the foam is thick enough, it is readily jetted and projected from a nozzle. When the particles of foam strike the plant, they do not tend to splatter and disperse away from the plant, but they adhere to it. The foam has a certain amount of cohesiveness and, therefore, when a particle of the foam strikes a portion of the plant, it tends to wrap around the plant. Foam need be applied therefore, from only one side of the plant to obtain complete coverage, since it spreads around the plant by the action described.

Another advantage is the tendency of the foam to stay in a cohesive stream once it leaves a nozzle. This has the advantage of providing a more accurate, directed spray, not adversely affected by the wind, and making it possible to apply the stream at greater distances than with a conventional spray of comparable liquid volume.

The density of foam is controlled by the amount of air that is incorporated in a liquid base. The art-skilled are well aware of available ways to vary the relative amounts of air and liquid and such variation, per se, is not the subject matter of this invention. For the invention, however, a dense foam is employed. Such a foam weighs at least about 3.9, preferably 5, pounds per cubic foot and at most about 31, preferably not more than 12, pounds per cubic foot. For foam which is generated from an aqueous base with air, the expansion is thus no more than about 16, and preferably at most 12, times the original volume of liquid and no less than about 2, preferably 5, times said volume; a density of about 8 pounds per cubic foot (about an 8 to 1 expansion) is considered optimum.

Cohesiveness is related to density. If the foam is expanded too much, it loses its cohesiveness; if it is not expanded enough, it tends to separate out and is watery. Dense and cohesive foam is required to achieve the outlined commercial economies. Such foam is that which weighs between about 3.9 and 31 pounds per cubic foot. The foam is preferably constituted by finely-divided bubbles and is readily prepared from agricultural chemicals [as active ingredient(s)] which are solids and/or liquids, soluble in the liquid medium or insoluble therein.

To produce foam of the type contemplated by the invention, it is necessary to have a liquid which will form the continuous medium of the foam, air which will occupy the bubbles of the foam, one or a combination of agricultural chemicals which are to be incorporated in the foam for application to plants or to ground where plants are either desired or not desired, surfactant and a foaming agent.

Although other liquids can be employed, water is preferred from the standpoint of cost, availability, flexibility and innocuousness. It can be used alone or in combination with other liquids. Air is the gas from which the foam is generated.

When reference is made to agriculture or agricultural, range and pasture lands are included in addition to cultivated fields; plants that are grown for profit, such as for food, fiber or ornament, as well as those which are to be eradicated, controlled or modified are within contemplation. Encompassed also is the treatment of land on which it is desired to preclude vegetation. The active ingredient (chemical) may thus be any one or combination of compounds which will accomplish at least one suitable treatment within the indicated scope.

The particular active ingredient(s) and the problem for which it is used to overcome are not the subject matter to which this invention is directed; for the most part these are known. The invention goes to the manner and form in which said ingredient(s) is applied. Exemplary treatment chemicals, however, are:

Hormones, e.g. Gibberellin (indolebutyric acid) and naphthaleneacetic acid,
Fertilizers, e.g. ammonium sulfate and urea,
Foliant nutrients, e.g. ferrous sulfate and soluble nitrogen compounds, chelated zinc and iron
Defoliants, e.g. sodium chlorate and arsenic acid,
Fungicides, e.g. Thiram (tetramethylthiuramdisulfide) and Folpet [N-(trichloromethylthio)-phthalimide],
Insecticides, e.g. Methoxychlor [1,1,1-trichloro-2,2-bis(p-methoxyphenyl)ethane]; Dieldrin (1,2,3,4,10,10-hexachloro-6,7-epoxy - 1,4,4a,5,6,7,8,8a - octahydro -endo-exo-1,4:5,8-dimethanonaphthalene),
Systemic (organic), e.g. Cycon; (American Cyanamid Co.); Birdin,
Herbicides, e.g. Banvel (Dicamba) 2,4-D,
Selective, e.g. Atrazine (2-chloro-4-ethylamino-6-isopropylamino - s - triazine); Linuron [3-(3,4-dichlorophenyl)-1-methoxy-1-methylurea],
Soil sterilants, e.g. Bromacil (5-bromo-3-sec.butyl-6-methyluracil); sodium metaborate tetrahydrate.

The foregoing are merely illustrative of what are contemplated by agricultural chemicals. The foam form is particularly advantageous for systemic herbicides and insecticides. The increased surface contact of the foam in a moist form with virtually all surface areas of treated plants improves the rate of absorption of active ingredients into the circulatory system of said plants.

Agricultural chemicals in the form of the subject foam is advantageously applied to many substrates. Said foam is useful for food crops, such as small grain, rice, corn, vegetables, fruit trees and melons; for ornamental plants, such as those used in home landscaping, highway right-of-ways and golf courses; for unwanted insects, such as sucking insects, e.g. aphids, scales and thrips, chewing insects, e.g. worms, grasshoppers and stink bugs, health hazards, e.g. mosquitoes and flies; for fungus, e.g. black spot, snow mold, rust and podery mildew; for unwanted vegetation, such as grasses, e.g. Dallis, Bermuda, barnyard and Johnson, land weeds, e.g. ragweed, pigweed and bitterweed, water weeds, e.g. hyachinth, alligator weed and water parsley, brush, e.g. mesquite, shinery oak and post oak; and for vegetation control, e.g. with land sterilants, chemical pruning and pine release (hardwood control).

The surfactant is a surface-tension lowering agent. The greater the capacity of the agent to reduce surface tension when dissolved in water and the greater its foaming ability, the more desirable such an agent is. For some applications, such as the treatment of ground to preclude vegetation, these may be the only prerequisites. In applications, such as fertilization, the surfactant (surface active agent) should be void of or have minimal toxicity to the plants involved; this is true for those surface agents which are to be employed in foam prepared for the treatment of all desired plants. When the foam is to be applied to leaves of a plant, it is also desired that the surfactant be one which wets waxy substances. There are numerous commercially-available surfactants which satisfy each of the foregoing prerequisites, and the particular selection of specific surfactant is not the essence of the subject invention.

Illustrative surface active agents that can be employed in the preparation of foam according to this invention include sodium glyceryl monolaurate sulfate, dioctyl sodium sulfosuccinate, sodium dodecylbenzenesulfonate, N-(2-diethylaminoethyl)oleamide acetate (Sapamine A), diethylmethyl-(2-oleoylaminoethyl)ammonium methyl sulfate (Sapamine MS), sodium tetradecyl sulfate (Tergitol 4), and sodium lauryl sulfate. With respect to surface active or wetting agents and foam promoting agents, prominant manufacturers provide numerous choices which meet virtually all variations of requirements, including a balance between properties and cost. Methods of evaluating surfactants are established by such organizations as the American Association of Textile Chemists and Colorists. The wetting ability is tested by means of the Syntron Tape Method or Draves Method. Materials which have high ratings by these test methods perform well as surfactants applicable for the subject invention. Foaming ability can be readily measured by the Ross-Miles Foam Test per ASTM D-12, D-1173-SIT (1953).

As is known, some surface active agents also serve as foaming agents, e.g. Tergitol Nonionic TMN. When such a surfactant is employed, no separate foam promoting agent is required.

Exemplary foaming or foam promoting agents are those capable of wetting waxy surfaces, e.g. Retzafoam 30 and Tergitol TMN (Union Carbide Corp.).

The relative proportions of ingredients are important only insofar as they produce a dense foam. Foam stabilizing agents, such as hydroxyethylcellulose and saponin powder can also be incorporated therein, but are not essential. The art-skilled know how to produce such foam.

Contemplated foam is stable foam. By stable foam is meant foam which will stay moist on a plant surface for at least from ten to fifteen minutes. Stable foam having the noted density is cohesive. Such foam is capable of being accurately broadcast distances from one foot to 200 feet from a ground operated applicator; such is not possible for agricultural chemicals applied in any other form. The foam is projected from such applicators either at low pressures, i.e. below 20 pounds per square inch (p.s.i.), e.g. from 9 to 20 p.s.i., or at high pressures, i.e. from 20 to at most 70 p.s.i. At the low pressures foam is broadcast from its source, e.g. a nozzle, at a rate of from about 3 to 10 miles per hour; at the high pressure, at a rate of from 40 to 90 miles per hour.

The best combination of pressure and nozzle size is readily determined and is somewhat dependent upon nozzle design. A most satisfactory design is provided by Flood Jet K 7.5, or even straight pieces of tubing with a minimum bore size of from 0.125 to about 0.625 inch, depending on the flow required. High pressures require the use of straight bore nozzles, whereas pressures below 20 p.s.i. generally require deflectors, such as the spraying system Flood Jet, in order to obtain foam globules ranging in size from 1/32 to 1/8 inch in diameter. Foam having larger particle sizes exhibits lower evaporation rates.

To prepare the foam, a foaming agent, agricultural chemical and water (in the form of a solution or a relatively stable suspension) are, e.g., pumped into an applicator unit and air is ejected thereinto so that, on emission, foam is created. The foam applicator unit permits simple adjustment of foam density so that the water content of the foam can be varied. In some applications, e.g. applying soil sterilants in confined bands or weed control chemicals in yards, a thick dry foam is required.

There are several different methods of applying the foam, the first being through ground applicator units with use of a hand gun. This type application permits the hand spraying of ditches, lawns and gardens, roadside right-of-ways, or any simialr type operation; it is of particular advantage for applying soil sterilants. A second method of application is using ground equipment with booms. Boom applications are most desirable when applying such herbicides as MSMA on lawns and turfs for control of Johnson grass, Dallis grass, and other undesirable grasses and in applying 2,4-D in pastures or on turfs for weed control. A third type of application is using a blower to propel the foam to the area desired to be covered. Another type ground application that has proved most successful is the mounting of a foam applicator on a shredder. This permits the spraying and shredding operation to be combined into one and has been highly successful as a brush control method. Exemplary mobile ground equipment is described in detail in U.S. Patent application Ser. No. 634,551 filed April. 28, 1967 now U.S. Pat. No. 3,618,856.

Aerial nozzles for fixed-wing aircraft and helicopters are also available for foam broadcasting. Eight nozzles are normally needed for most spray planes. These nozzles have been designed and are commercially available. Most spray planes may be adapted in a matter of minutes by simply changing nozzles. No other special equipment is needed for either airplane or helicopter applications. The existing pumps and spray booms are utilized.

The system to produce the foam may vary with the application, but land equipment generally consists of a water pump, an air compressor, foam generator and regulation module. The solution is contained in a conventional spray tank. A surfactant mixture containing, e.g., foam promoters, stabilizers and wetting agents is added to the spray solution. The surfactant mixture is used at the level of 1/2 to 3/4 percent by volume. The water and air are thoroughly mixed and emerge from the equipment as a foam under pressure which can be turned on or off at will. The foam is conducted to the spray nozzles in small conventional sized hoses. An exception to this equipment scheme is found on the aerial spray nozzles for both fixed-wing and helicopter applications. In the case of these nozzles, the foam production and spraying functions are combined in one nozzle unit, conventionally mounted to the standard spray boom. The plane pump and control system supplies the liquid from the plane's liquid tank. The foam producing and dispensing nozzles are mounted along this boom similar to conventional nozzles. On and off is sharp, with no drizzle, and coverage is very uniform and thorough. Ram air from the motion of the air through the nozzles is used to supply the air portion of the foam.

In most applications the water spray volume is increased by a factor of 10 to 15 times. Hence the most obvious characteristic of foam is that the spray volume is expanded or stretched making it a practical "water stretcher."

Tests and field applications have shown that water hyacinths can be controlled with one application of foam. One to one and one-half pounds of active ingredient (dichlorophenoxyacetic acid) per acre are aerially applied at a total solution of three gallons per acre. Hand gun applications have also shown the same effects utilizing 30 to 40 gallons of total solution applied per acre. The total cost of chemical and application in controlling water hyacinths when using fixed-wing aircraft is about $3 to $3.50 per acre. Similar results have been obtained in the control of alligator weed in irrigation and drainage ditches; the only difference being that two applications are needed. Consequently, the cost per acre for control of alligator weeds normally runs $5.50 to $6.00 per acre in aerial applications, the second application requiring less active ingredient.

Results in controlling undesirable brush, such as mesquite, have also proved most satisfactory and economical. Complete desiccation is accomplished in approximately two or three months after spraying. Annual resprouts have shown effects by growth retardation and die back for two years after initial application. Total solution applied per acre has varied from two to three gallons per acre. Approximately 16,000 acres of brush and weeds were treated in 1968 with foam according to this invention by aerial applications. The active ingredients used for this purpose were dichlorophenoxyacetic acid and trichlorophenoxyacetic acid.

Control of Johnsona grass, weeds, and undesirable brush in irrigation and drainage ditches has proved most costly when using conventional water spray systems. Use of the subject foam reduces the normal recommended rate of chemical needed as well as the rate of water needed per acre. In most applications utilizing a hand gun only 1/2 to 1/3 of the normal amount of water is needed when applying foam. Less water usage amounts to increased labor efficiency.

Broadcast application of 2,4-D to pasture weeds was accomplished by the use of foam with a ratio of 6 to 8 parts air to 1 part water dispersed through a conventional spray boom utilizing Spraying System Company's Flood Jet K 7.5 nozzles spaced at 22", center lines mounted approximately 34" above the ground. Application speeds of 4 to 5 miles per hour with boom pressure of 10 p.s.i. produced excellent coverage so as to obtain 99% or better weed kill.

MSMA Weed and Grass Killer was applied to industrial fence lines and plant yards by the use of Spraying Systems #L-43 hand gun equipment with a nozzle consisting of a straight bore at least 1 1/2' long and 7/16" internal diameter. Foam densities ranged from 6 to 10 parts of air/1 part of water and pressures from 30 to 70 p.s.i. with liquid rates of 100 gallons per acre produced a complete desiccation of most broad leaf weeds and grasses.

It is an object of this invention to apply agricultural chemicals to a substrate to be treated in such a manner that the treated substrate will be readily ascertainable by visual inspection. Another object is to provide a form in which agricultural chemicals can be accurately directed, even for considerable distances, thus minimizing waste of chemicals, possible damage to other plants and hazard to operators. A further object is to apply such chemicals in a form in which they will remain in a moist condition and evenly spread over waxy surfaces of contacted leaves. An object is to provide a form in which agricultural chemicals are capable of being projected to their sites of application in an essentially cohesive stream. A still further object is to devise a form in which agricultural chemicals can be applied with a minimum of liquid carrier so as to reduce the costly time consumed in refilling broadcasting equipment. It is also an object to provide a method for surrounding stems or trunks of plants with material directed thereat from a single direction. An additional object is to place chemicals in a form in which large-scale commercial applications can be made to extended areas in relatively short periods of time. Other objects will be apparent from the description and examples herein.

The examples which follow are merely illustrative in nature and not in any way limitative. They show the versatility of foam applications and the economy resulting therefrom, particularly with respect to large scale operations, i.e. treatment of plots in excess of one acre and ordinarily in excess of 50 or even 100 acres.

EXAMPLE 1

Two pounds of Retzanol NP–100 and 2 pounds of Retzafoam 30 were mixed with 100 gallons of water. Retzanol NP–100 is an alkyl aryl polyether alcohol (low surface tension) surfactant [nonylphenol base with about 10 moles of ethylene oxide]. Retzafoam 30 is a foaming agent [triethanolamine salt of sulfamic acid and an alkyl aryl polyether alcohol (nonylphenol base with 3 to 5 moles of ethylene oxide)]. Both of these products are manufactured by Retzloff Chemical Company, Houston, Tex., and are described in their technical data sheets, which are published and readily available to the trade.

This mixture of water, foaming agent and surfactant is referred to hereinafter as a standard low-surface-tension foaming mix.

To the low-surface-tension foaming mix is added 6 pounds of the triethylamine salt of 2,4,5-trichlorophenoxyacetic acid, which is a well known organic herbicide commonly referred to as 2,4,5-T. The liquid is pumped under pressure to a foaming machine where it was continuously aerated and expanded to 8 times its original volume. Stated otherwise, the foam produced by this process weighed about 8 pounds per cubic foot.

When the foam was then projected from a nozzle, it was jetted at a speed of approximately 3,000 feet per minute and was projected for approximately 5 to 20 feet (or further) to undesirable brush for the purpose of killing the brush. Specifically, it was projected against mesquite bushes which range in size from 6 inches to 10 feet in height. The material was projected from the nozzle at a rate of 10 gallons per minute. In heavy brush, approximately 30 gallons were applied per acre.

The foam formed a thick cohesive material which held together while being projected even 20 or more feet from the nozzle. When the particles or globs of foam struck the mesquite branches, they adhere thereto and enveloped the branch, often completely wrapping around the branch although projected from only one side thereof. The nozzle was manually controlled and directed in the general direction of a mesquite bush or tree. Good eradication of the mesquite was accomplished.

One method of aerating the foam is to pump the liquid under pressure into a long hose and, also, pump compressed air under pressure into the long hose. The travel of the liquid and the compressed air through the hose will bring about the necessary agitation to cause the production of foam. On the end of the hose, place a valve and a nozzle. It is necessary to have a valve adjacent to the nozzle or dripping will occur. The foam was projected from the nozzle into brush to be killed. The foam broke into small droplets at the nozzle, but the droplets were of such size that they could be projected through the air onto the brush, thereby being applied to the brush. The foam remained visible on the brush for a period of about 5 minutes so that it was possible to note visually that good coverage of the brush was obtained. Also, after the foam struck the brush, it adhered to the brush. When the foam would strike dry bark or leaves of a plant, the foam would wet the surface of the plant and spread over the plant, remaining in close contact with the surface of the plant.

In the case of applying the foam to mesquite and brush, the mesquite to which the foam was applied did not go into shock and the leaves did not immediately wither and drop off; there was no immediate effect from the application indicating that the circulatory system continued to operate so that the herbicide was absorbed into the circulatory system of the plant to effect a complete kill of the plant rather than merely causing a temporary loss of foliage due to shock.

Also, good coverage by aerial spraying was obtained by applying about 20 gallons of water to the acre, which contained about 2 pounds of active herbicide. No drift was experienced over 20 yards beyond the application of the foam.

If additional compressed air is used so that a foam is produced which has a greater than 16 to 1 expansion, or which weighs less than 3.9 pounds per cubic foot, difficulty is experienced in that the foam is so light that it tends to drift in the wind and cannot be readily directed to the desired point. Also, when there is a greater expansion than 16 to 1, it is more difficult to break the foam up into small droplets at the nozzle. When less compressed air is used, i.e. the low-surface-tension foaming material is expanded less than four times its original volume so that it is heavier than about 15 pounds per cubic foot, the material is watery and tends to separate into a foam and water phase.

EXAMPLE 2

A standard low-surface-tension foaming mix (liquid) was prepared; 6 pounds of 2,4-D were added thereto and the resultant was foamed as described in Example 1. The resulting foam was applied by injection from the nozzle onto water hyacinths, a floating water plant which has no roots in the soil. The application onto the surface of the plants was visually observed and after the application to the plants, the low surface tension of the foam caused the foam to spread over the leaves making good contact with the leaves of the plant. Good kill of the water hyacinths resulted.

EXAMPLE 3

A standard low-surface-tension foaming mix (prepared as in Example 1) was prepared and two pounds of 1-naphthyl-N-methylcarbamate (Sevin) wettable powder was added thereto. Sevin is a well-known insecticide. The product prepared with Sevin was applied to orchard trees, heavily infested with scale, during the month of January when the orchard was dormant. By visual observation at the time of spraying, the foam could be seen as it was applied to the trees and that all portions of the trees and their limbs having scale were covered. Any voids occurring during coverage were readily detectable so additional foam could be applied at the time. The foam was applied from a hand nozzle. Because of the low surface tension of the foam, it was observed that the foam spread and made good contact with the scale. Good control of the scale resulted. No noticeable drift of the foam was noticed from the point of application.

EXAMPLE 4

A standard low-surface-tension foaming mix is prepared and 13 pounds (per 100 gallons of liquid) of MSMA, a product which has an active ingredient of monosodium methylarsenate, is admixed therewith. The mixture was transferred to a small tank where it was foamed and applied by a hand nozzle on broadleaf grasses and weeds in a drainage ditch in an urban area. Good coverage was obtained, as confirmed by on-the-spot observance as it was applied. Ornamental plants, such as flowers and trees in the yards adjacent to the drainage ditch were not affected in any way. In addition, a uniform application was obtainable because it was possible to watch and see that too heavy an application was not applied. Therefore, Bermuda grass and other bent grasses in the drainage ditch were not killed. It is not desirable to kill the fine leaf grasses or bent leaf grasses inasmuch as they prevent erosion of the soil in the ditches. However, the broadleaf grasses and weeds in the ditches were killed by the application. Fine leaf grasses would be killed by a heavy dosage of MSMA but, because of the ability to control the amount of foam applied by visual observation, the fine leaf grasses were not killed. Also, there was no drift of the dense foam to the adjacent ornamental plants in the yards near by. Water consumption was greatly reduced from that normally used in a liquid application, resulting in a greater economy in application because additional crew time was not needed to return frequently for water to mix another batch for further treatment.

EXAMPLE 5

A standard low-surface-tension foaming mix was prepared and 6 pounds of 3-(dimethoxyphosphinyloxy-N,N-dimethyl-cis-crotonamide (Bidrin), a systemic insecticide which is commercially available, were admixed therewith. The mixture was pumped through a foam generating machine in which it was aerated, thus producing foam weighing about 8 pounds per cubic foot. It was then projected from a tractor-mounted rig by nozzles positioned to project the foam along either side rows of small cotton plants. The nozzles projected about 20 gallons of the mixture per acre at a nozzle velocity of about 1500 feet per minute. The application resulted in good coverage of the foliage and stems of the cotton plants, and it was possible to adjust the nozzles by visually inspecting said coverage as the foam was applied. There was little waste upon the ground. No drift of the insecticide of over 40 inches was noted. Effective control of insects resulted. The cotton plants were approximately 6 inches tall.

The material may be broadcast from the foam generator by including an air blast at the jetting nozzle. This will break up the particles of foam into small droplets approximately ⅛ to 1/16 inch in diameter. A spray of this foamed material will not drift and will stick to a plant once it contacts same.

Foam generators for aerating the foam are well known to the art and commercially used for fire-fighting and other purposes. (Materials, other than that illustrated in this example, which cause water to foam are well known and commercially available.) Foam generation machines are well known to the art and, as such, do not specifically form a part of the invention which is the subject of this application. Such generating machines are disclosed in U.S. patents to Urquhart et al., 2,198,585, and to Swift et al., 2,249,095. This specific mention of these two types of foam generators, however, is not to limit in any way the type of foam generation used.

EXAMPLE 6

A foaming liquid was prepared by mixing 4 pounds of Retzafoam 30 with 100 gallons of water. 10.5 pounds of 5 - bromo-3-isopropyl-6-methyluracil (Hyvar X) (a relatively water-insoluble soil sterilant which is applied to soil to preclude the existence of plant life therein) is mixed with the foaming liquid, which is thereafter aerated to form a foam of about 8 pounds per cubic foot. The foam is applied to the soil along fences of an airfield, along fences of industrial plants and around lights in an airfield. The foam being visible on the ground, a uniform application was made. Along the fences, the application was made as light as possible to obtain solid coverage. It is characteristic of Hyvar that if a space six inches square is left without treatment, weeds will sprout and grow in this space. However, a heavy application is unnecessary and, due to the cost of the treatment, unwarranted. Around the landing lights of an airfield, where no vegetation of any kind is desired, a heavier and still uniform application can be applied.

Complete ground sterilization was obtained around fences for over one year. Annual applications were made around the landing lights of the airfield for an extended period of time. No drift over 12 inches from the desired location was experienced. The foam was disbursed from a hand-held nozzle.

EXAMPLE 7

In the following tests Native and Bermuda grass infested with common pasture weeds, e.g. broomweed, ragweed, goatweed and briars, were treated with a standard low-surface-tension foaming mix containing 2.7 pounds of active 2,4-D [(2,4-dichlorophenoxy)acetic acid] amine and 0.53 pound of active 2,4,5-T amine per gallon of chemical. The combination of foaming mix, 2,4-D amine and 2,4,5-T amine is referred to hereafter as Foamicide-DT. The Foamicide-DT was applied with two Model 350 PTO Foamicide applicator rigs with tractor-mounted 24-foot spray booms in Chappell Hill, Tex.

Test No. 1.—An area of 200 acres of Bermuda grass infested with broomweed and ragweed was treated on Aug. 1 and 2, 1967, with foam prepared from 1 pint of Foamicide-DT and 8 gallons of water per acre. The moisture condition was dry, and the fertility was good.

It took nine hours to apply the foam. The cost of equipment, labor and chemicals totalled $1.28 per acre.

By Aug. 20, 1967, 95 percent of the weeds had been killed by this treatment and the remainder, although living, showed desiccation and no signs of growing further. These results are so good for late season treatment and lack of moisture that the 2,4,5-T could probably have been eliminated.

Test No. 2.—The preceding test was repeated on a different 500 acre plot on Aug. 3, 1967, using 1.5 pints of Foamicide-DT and 8 gallons of water per acre at a total cost of $1.67 per acre. The increase of chemical concentration did not increase the rate of percent of kill.

Test No. 3.—An area (never previously sprayed with 2,4-D) of 500 acres of Bermuda grass infested with ragweed, goatweed and briars was treated from Mar. 16 to 20, 1968, with foam prepared from 0.75 pint of Foamicide-DT and 8 gallons of water per acre. The moisture condition was wet, and the fertility, fair.

The treatment took 32 hours and was effected at a total cost of $1.17 per acre. By Apr. 4, 1968, 98 percent of the weeds had been killed over the 500 acre plot.

Test No. 4.—An area (sprayed a year earlier with 2,4-D) of 1000 acres of Native and Bermuda grasses infested primarily with broomweed, ragweed and goatweed and having clover from 8 to 10 inches high was treated from Mar. 21 to Apr. 14, 1968, with foam prepared from 1 pint of Foamicide-DT and 8 gallons of water per acre. The moisture condition was wet, and the fertility, fair.

The treatment took 38 hours and was effected at a total cost of $1.28 per acre. By Apr. 28, 1968, 100 percent of the clover and 95 percent of the weeds had been killed by this treatment.

The results obtained on the clover were excellent. Notwithstanding the fact that the tall clover provided substantial cover for shorter weeds, the weed kill was good.

In the preceding four tests no drift damage or adverse effects on nearby vegetation was found. Even without placing a monetary value on the increased rate of weed kill obtained by use of Foamicide-DT, the cost of said use was only sixty percent that of applying the same amounts of the same chemicals by conventional spraying.

EXAMPLE 8

Weed control is necessary for top crop yields of milo. Due to the proximity of cotton or other susceptible crops 2,4-D cannot be employed for this purpose; atrazine (2-chloro - 4 - ethylamino - 6 - isopropylamino - s - triazine) is used in lieu thereof. The particular soil of this example requires 3.75 pounds of atrazine and 15 gallons of water per acre when application is by conventional spray means, and even this rate of application does not normally control weeds over 2 or three inches high.

A standard low-surface-tension foaming mix containing atrazine was applied to 1000 acres of milo in which the weeds were 18 inches high (heavy rains prevented earlier application). The combination of foaming mix and atrazine is referred to as Foamicide-A. Foam prepared from the Foamicide-A and water was applied to the milo at a rate of 1.75 pounds of atrazine in a total of 8 gallons of solution per acre. This application controlled the weeds throughout harvest.

Using foam prepared from Foamicide-A for post-emergence weed control, greater control was obtained than was previously possible by conventional spraying of the noted larger concentration of atrazine. The use of less water and obtaining an increased crop were other factors in making the crop profitable.

EXAMPLE 9

Army worm infestation in Bermuda and oat pastures was completely eliminated by treatment with foam prepared from a standard low-surface-tention foaming mix containing Sevin. The rate of application was 0.5 pound of Sevin wettable powder per 8 gallons of total solution per acre. The foam was applied with a ground rig, such as that referred to in Example 7.

EXAMPLE 10

On Mar. 20, 100 acres of water canals were treated with foam applied by an airplane. The rate of application was 2 pounds per acre of 2,4-D and 3 gallons per acre of water. (Two quarts of low-surface-tension foaming mix were incorporated in each 100 gallons of aqueous composition.)

The prevalent plant species was alligator weed; desert willow and other weed species were also growing on canal banks. The total cost of application was $2.47 per acre.

Evaluation on Mar. 27, revealed that 90 percent of the alligator weed was dead; remaining growth was pale green in color and showed no signs of proper growth. The desert willow was killed, and other weed species along ditch banks were controlled.

Although a May 1st spraying had been planned, the slight regrowth by Apr. 29, obviated further aerial spraying; the initial spraying had given adequate control for the proper movement of the water.

EXAMPLE 11

On Apr. 15, 40 acres were treated with foam applied by a helicopter. The rate of application was 2 pounds per acre of 2,4-D, 10 gallons per acre of water and 3 quarts of low-surface-tension foaming mix for each 100 gallons of aqueous composition.

The prevalent plant species were water hyacinth, alligator weed and tea weed. A thick mass of water hyacinth (20 percent flowered) covered entire ditch. The total cost was $10 per acre—$1 per gallon of solution sprayed in the form of foam.

By May 20th, the water hyacinth was showing epinasty; slow desiccation and kill were very evident; and there were no signs of resprout.

EXAMPLE 12

On April 22, 53,000 square feet of level terrain were treated with foam applied by a hand gun. A total of 50 gallons were applied to the entire plot. Two different rates of application were employed: 2 quarts and 4 quarts of 2,4-D per 50 gallons; the 50 gallons also included 1.5 quarts of low-surface-tension foaming mix. (Only 3 quarts of the 50 gallons were applied at the lower 2,4-D concentration.)

The prevalent plant species were distaff thistle, mesquite brush, ragweed and broomweed. The thistle was 6 to 8 inches high, and the mesquite averaged 5 feet in height.

Evaluation on May 11th showed that complete (100 percent) control had been obtained. (No control had previously been effected by conventional water spraying unless water rates of 200 gallons per acre were used for hand-gun application or 500 gallons per acre were used for water broadcast.)

EXAMPLE 13

On May 1, a rice field (divided into four plots) was treated with foam by airplane application. The wind velocity was from 10 to 15 miles per hour. The prevalent included barnyard grass, day flower, smartweed and hoorah grass. Details of the respective applications are set forth in Table A. Table B is an evaluation after 48 hours following application; Table C is a similar evaluation on May 15. For each evaluation a scale of 1 to 10 is used, 10 denoting 100 percent desiccation.

TABLE A

| Application | Plot No. | Propanil[1] Pounds | Propanil[1] Gallons | LSTFM[2] | Water gallons | Acres |
|---|---|---|---|---|---|---|
| I—Control | 4 | 88 | 22 | 0 | 200 | 22 |
| II—Test | 1-2 | 20 | 4 | 0.75 | 45 | 10 |
| III—Check | 3 | 12 | 3 | 0 | 25 | 6 |

[1] Rogue Propanil employed for I and III; Propanil 50 percent concentrate employed for II.
[2] Low-surface-tension foaming mix.

TABLE B

| Plot | Barnyard | Day Flower | Smartweed | Hoorah |
|---|---|---|---|---|
| 1 | 5 | 3 | 3 | 5 |
| 2 | 5 | 5 | 4 | 5 |
| 3 | 1 | 0 | 0 | 3 |
| 4 | 5 | 1 | 3 | 4 |

TABLE C

| Plot | Barnyard | Day Flower | Smartweed | Hoorah |
|---|---|---|---|---|
| 1 | 8 | 10 | 9 | 7 |
| 2 | 8 | 10 | 6 | 8 |
| 3 | 4 | 0 | 2 | 5 |
| 4 | 8 | 10 | 5 | 7 |

EXAMPLE 14

On May 7, a 20-acre orchard of peach trees varying from 4 to 10 feet in height were treated with foam. A total of 200 gallons of water, 4 pounds of Sevin 80% wettable powder, 3 pounds of Spurlock S–Z and 6 quarts of low-surface-tension foaming mix were applied for the control of insects and fungus normally encountered in peach production.

The foam density was about 8 pounds per cubic foot. A pressure of 50 pounds per square inch was employed. Although the normal interval between applications is one week when using water sprays, a two-week interval elapsed before the next application. The foam application made it possible to apply the treating material more uniformly in view of the visibility and long-lasting ability of the foam. There was less danger of damage to the fruit because the pressure of application was lower than that employed with water sprays.

The application of foam on May 21 was identical to that on May 7. It was applied even though there was no reason to believe an additional spraying was necessary. A 14-day interval between foam applications has now been adopted. The foam applications have cut all application costs by 50 percent.

EXAMPLE 15

On May 9, four plots of rice field were treated with foam by airplane application. The wind velocity was from 10 to 15 miles per hour. The prevalent plant species included barnyard grass (seedling to 4 tiller stage), Colorado sedge (4 to 8 inches high), seinna bean and several less harmful species. Infestation was medium to heavy in areas. For applications I and IV water sprays were applied; foam applications were used for tests II and III.

Details of the respective applications are set forth in Table D.

TABLE D

| Application | Plot | Propanil[1] Lb. per acre | Gal. | LSTFM,[2] quarts | Acres | Water, gallons | Kill, per cent |
|---|---|---|---|---|---|---|---|
| I—Control | 3 | 3 | 20 | 0 | 20 | 180 | 80 |
| II—Test | 1 | 2 | 8 | 4 | 20 | 90 | 70 |
| III—Test | 2 | 1.5 | 6 | 3 | 20 | 90 | 50 |
| IV—Check | 4 | 1.5 | 5 | 0 | 10 | 95 | 30 |

[1] For applications I and IV crystal propanil (3 pounds per gallon) were used; propanil 50 percent concentrate was used for applications II and III.
[2] Low-surface-tension foming mix.

EXAMPLE 16

On May 14, 88 acres were treated with foam applied from a helicopter. The rate of application was 2 pounds per acre of 2,4-D, 10 gallons per acre of water and about 0.3 quart per acre of low-surface-tension foaming mix.

The prevalent plane species included alligator weed (growing rapidly—30% of the area solid, 70% intermittent growth), tea weed, rag weed, miscellaneous aquatic species and brush (desert willow, prickly ash and water elm) having a thick canopy.

The total cost of the application was $10 per acre—$1 per gallon of solution sprayed. (Previous conventional chemical applications were indicated to have cost from 5 to 6 times as much without obtaining control.)

By May 20, the alligator weed showed epinasty. There was a yellowing of leaves on that part of the weed which was out of water.

EXAMPLE 17

On May 20, 20 acres were treated with foam applied by an airplane. The total application included 60 pounds of propanil in the form of a 50 percent concentrate, 85 gallons of water and 0.6 quart of low-surface-tension foaming mix.

The prevalent plant species included barnyard grass, smartweed, day flower and hoorah grass.

My May 22, the grass showed 50 percent desiccation. The coverage was equal to that obtained with a control application of 7 gallons per acre on the same day. For the control 100 acres were sprayed with 300 gallons (3 pounds per acre) of propanil (Stam) and 700 gallons of water by conventional water spraying.

For Examples 10 to 17 all of the dates occurred in the same year. They are relevant to show the time of the year and intervals between application and evaluation.

What is claimed is:

1. The process of controlling drift in the application of agricultural chemicals comprising applying said chemicals in a cohesive homogeneous foam having a liquid phase and a gaseous phase and a density from 4 to 31 pounds per cubic foot, the liquid phase being continuous and enveloping finely-divided bubbles of gas, said liquid phase consisting essentially of at least one agricultural chemical, inert liquid medium and surfactant, the foam having an effective concentration of the agricultural chemical, the surfactant being a surface tension lowering agent, and the gaseous phase being primarily air.

2. A process according to claim 1 wherein the surfactant is both a wetting and a foaming agent.

3. A process according to claim 1 wherein the liquid phase is an aqueous phase containing a foaming agent, the foam having the ability to wet a waxy surface.

4. A process according to claim 1 wherein the foam consists essentially of from 1 to 11 parts by volume of gaseous phase per part by volume of liquid phase.

5. A process according to claim 4 wherein the agricultural chemical is an organic systemic pesticide.

6. A process according to claim 5 wherein the pesticide is a herbicide.

7. A process according to claim 5 wherein the pesticide is an insecticide.

8. A process according to claim 1 wherein the foam is produced by continuously and thoroughly admixing a foamable liquid, having dispersed therein the agricultural chemicals, surfactant and foaming agent, with the gas which comprises the gaseous phase of the cohesive homogeneous foam immediately prior to discharging said foam.

9. A process according to claim 1 wherein the foam is continuously generated and discharged, said foam having a uniform consistency and being capable of being accurately broadcast a distance of up to 200 feet.

10. A process according to claim 1 for applying an effective amount of an agricultural chemical to a surface of a plant which is not in the line of sight from the point of discharge of the applicator which comprises jetting foam from said applicator onto the plant at a site which is within said line of sight at a sufficient velocity to cause the foam to wrap around said plant to the surface.

11. A process according to claim 1 for introducing a chemical into the circulatory system of an agricultural plant which comprises jetting onto the plant foam wherein the agricultural chemical is a systemic organic pesticide.

12. A process according to claim 11 wherein the jetting is that of a high velocity air stream which projects the foam as small individual droplets.

13. A process according to claim 3 wherein said surfactant reduces the surface tension of water at least 50 percent.

14. A process according to claim 13 wherein said surfactant reduces the surface tension of water to at most 30 dynes per centimeter.

15. A process according to claim 1 said foam containing from ½ to ¾ percent by volume, based on the volume of the liquid phase, of a surfactant mixture and being capable of being accurately broadcast a distance of up to 200 feet.

References Cited

UNITED STATES PATENTS

| | | |
|---|---|---|
| 2,557,618 | 6/1951 | Stull. |
| 2,198,585 | 4/1940 | Urquhart et al. |
| 2,249,095 | 7/1941 | Swift et al. |
| 1,995,853 | 3/1935 | Hunsaker _____ 47—2 |
| 2,875,555 | 3/1959 | Thiegs et al. _____ 47—9 |
| 2,916,855 | 12/1959 | Thiegs _____ 47—9 |
| 2,945,322 | 7/1960 | Gaeth et al. _____ 47—9 |
| 3,484,229 | 12/1969 | Floyd et al. _____ 71—79 |

FOREIGN PATENTS

| | | |
|---|---|---|
| 486,113 | 5/1938 | Great Britain. |

OTHER REFERENCES

C & E News, "New Pesticide Spray Methods Due This Spring" (1966), C & E News, Mar. 28, 1966, pp. 42–43.

McCutcheon, "Detergents and Emulsifiers Annual" (1966), pp. 163 and 202.

LEWIS GOTTS, Primary Examiner

G. HOLLRAH, Assistant Examiner

U.S. Cl. X.R.

71—27, 28, 54, 63, 66, 79, 92, 93, 97, 116, 117, 118, DIG. 1; 424—222, 300, 358, 361, 362